Figure 1:
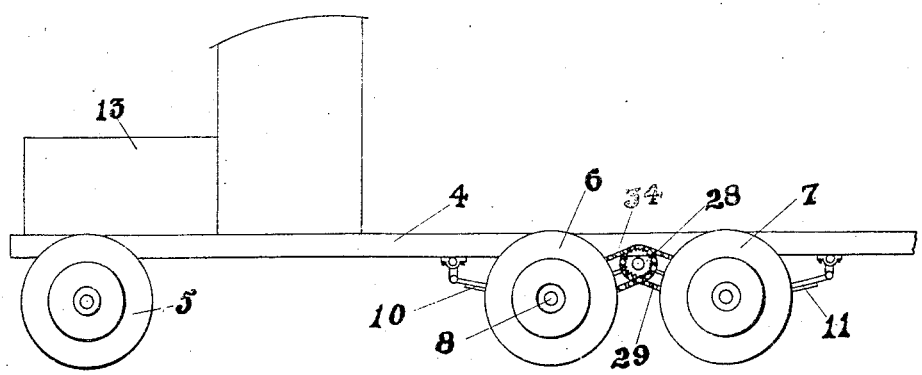

Oct. 20, 1931.  O. R. ROBINSON  1,828,073

DRIVING MECHANISM FOR AUTOMOTIVE VEHICLES

Filed Nov. 25, 1929

ORVILLE RAYMOND ROBINSON

INVENTOR

BY *Samuel E. Fouts*

HIS ATTORNEY

Patented Oct. 20, 1931

1,828,073

UNITED STATES PATENT OFFICE

ORVILLE RAYMOND ROBINSON, OF VENTURA, CALIFORNIA

DRIVING MECHANISM FOR AUTOMOTIVE VEHICLES

Application filed November 25, 1929. Serial No. 409,463.

This invention relates, generally, to automotive vehicles; more particularly, to trucks having a plurality of driving wheels on each side of the vehicle frame, and, still more particularly, to vehicles of the type just mentioned wherein the said driving wheels are so connected as to be capable of independent rotative movement.

As will be understood, in a vehicle having a front steering wheel and a plurality of rear driving wheels on each side of the vehicle, such weaving back and forth or zig-zagging of the front of the vehicle as causes the front wheels to deviate some distance from a straight line will result in a relatively slight deviation of the rearmost drive wheel from the straight line. Similarly, any of the driving wheels in front of the rearmost wheel will partake of a greater deviation from the straight line than does the rearmost wheel. This means that the forward driving wheels travel through longer paths than does the rearmost wheel. If these wheels be geared together so as to be compelled to rotate with equal speeds, one tire or the other must slip upon the roadway, which results in a rapid wearing of the slipping tire. In vehicles so driven, it is essential that all of the tires of the driving wheels be maintained of equal diameter, else there will be a slippage on the roadway even when the vehicle is running in a straight line. If, then, one tire becomes excessively worn it becomes necessary to replace the entire set of tires in order that they may all be of the same diameter. Further, when an unevenness in the roadway is encountered, whether it be a ridge or a depression, the wheel encountering such unevenness is required to travel through a longer distance in passing over the unevenness than are the wheels which remain on the level roadway. Under either condition mentioned, the operation results in wearing the tires and in throwing such excessive stresses upon the chains or other connecting driving mechanisms as frequently to result in breaking them.

It is, therefore, the object of my invention to overcome these disadvantages by providing mechanisms in the driving trains of gearing which permit the several driving wheels to have independent rotative movement. In my preferred form of invention, these mechanisms consist of sets of differential gearing. A further object of the invention is to mount the several sets of differential gearing within a common gear casing wherein they may be caused to operate in an oil bath, thus to prevent excessive wear.

Any practicable number of driving wheels may be provided on each side of the vehicle. At the present stage of development of the art, however, it is customary to use two drive wheels on each side, and I have therefore chosen to illustrate my invention as employing that number of wheels. The claims herein are not intended to be limited to the specific structure illustrated any farther than is made necessary by the specific terms employed therein, and it is understood that the details shown may be varied without departing from the spirit of my invention.

Figure 2:
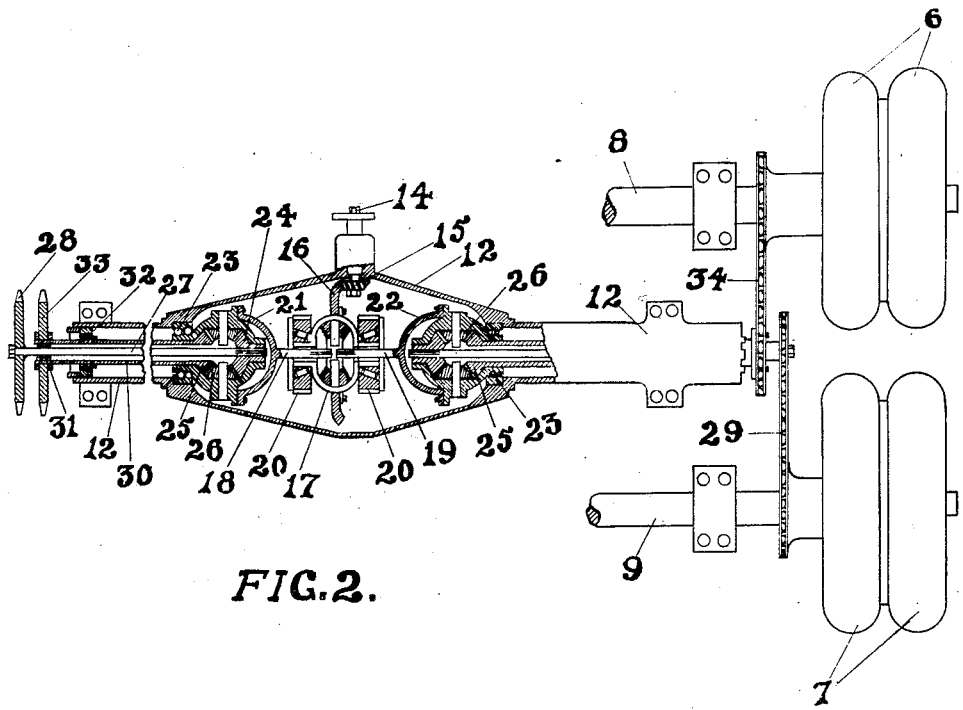

In the accompanying drawings, Fig. 1 is a side elevation of an automotive vehicle showing two driving wheels at the side to illustrate the arrangement of the driving mechanism with reference to said wheels, and Fig. 2 is a plan view, partly in section, showing the drive mechanism as it is employed for driving two wheels upon each side of the vehicle.

Referring to the drawings for fuller description, 4 represents the frame, and 5 the front steering wheels of an automotive vehicle. At the rear end upon each side of the frame 4 are two driving wheels, designated 6 and 7 respectively, 6 being the front driving wheel. These wheels are mounted upon axles 8 and 9 which are attached in the conventional manner to the springs 10 and 11. It will be understood that the springs are so connected with the vehicle frame as to permit the axles and the wheels to have vertical movement with reference to the frame, as is customary.

Mounted upon and extending transversely of the frame between the axles 8 and 9, is the elongated gear casing 12, shown particularly in Fig. 2. This casing is similar to the ordinary differential housing of automotive vehicles, in that it includes the differential gearing and is adapted to hold a bath of oil for lubricating purposes. This being well understood by those skilled in the art, more specific illustration is considered unnecessary. The vehicle is driven from a suitable prime mover, such as an internal combustion engine, within the hood 13, and power is transmitted from this prime mover to the gearing within the casing 12 through a shaft 14, a portion of which is shown in Fig. 2. Within the casing the shaft 14 is provided with a driving pinion 15 which meshes with a master gear 16. While this means of driving the master gear is at present preferred, it will be understood that, instead of having a pinion driven master gear, the latter may be a worm wheel or a sprocket wheel rotated by a worm on the shaft 14 or by a chain driven from the prime mover. The master gear 16 is connected to the differential gear casing 17 within which is the usual set of differential gearing for turning shaft sections 18 and 19, the differential gearing permitting these shaft sections to rotate at different speeds so that the wheels on one side of the vehicle may rotate more slowly or more rapidly than those on the other side. This being ordinary automotive construction, further detailed description is deemed unnecessary. The shaft sections rotate in suitable roller bearings 20 within the gear casing.

Instead of extending the shaft sections 18 and 19 outside of the casing and gearing them with the driving wheels 6 and 7, they are made relatively short and are connected to bell-shaped members 21 and 22 respectively, these members forming parts of housings for other sets of differential gearing. The housings are suitably journaled within the gear casing, as indicated by the roller bearings 23. Since the trains of gearing on the two sides of the vehicle are alike, it is sufficient to describe but one train.

Within the housing 21 are the driven beveled gears 24 and 25 having the customary orbital pinions 26 meshing therewith, the latter being carried on pins which project inwardly from the housing. The gear 24 is splined upon the inner end of a shaft 27, upon the outer end of which is secured a sprocket wheel 28. A sprocket chain 29, shown at the right in Fig. 2, passes over the wheel 28 and about a sprocket wheel on one of the driving wheels 6 or 7. As shown, it is arranged for driving the rear wheel 7. The gear 25 is attached to a tubular shaft 30 which surrounds the shaft 27, the latter being suitably journaled within the tubular shaft, as by ball bearings indicated at 31. The tubular shaft is similarly journaled within the gear casing 12, as is indicated by ball bearings at 32. Upon its outer end the tubular shaft is provided with a sprocket wheel 33 over which passes a sprocket chain 34 which drives the wheel 6, as will be understood.

From the above description it will be seen that I have provided a driving gear for automotive vehicles in which a plurality of driving wheels at each side of the vehicle may be driven and permitted to have independent rotative movement, and that the several sets of gearing employed are all contained within a single gear casing wherein they may be kept adequately lubricated.

Having thus disclosed my invention what I claim as new and desire to secure by Letters Patent is:

1. In an automotive vehicle, a plurality of driving wheels on each side of the vehicle, a gear casing connected to and extending transversely of the frame of the vehicle, a pair of alined shaft sections within the gear casing, differential gearing within the casing and connecting the adjacent ends of the shaft sections, said differential gearing comprising pinions secured to the respective shaft sections, a master gear connected with the differential gearing, means for driving the master gear, a differential housing connected with each of the shaft sections, bearings within which the shaft sections are journaled, said bearings projecting from the gear casing and supporting the respective shaft sections between the differential housings and the pinions thereon, a set of differential gearing within each of said differential housings, a tubular shaft connected with one set of differential gearing and extending outwardly through one end of the gear casing, a shaft journaled within said tubular shaft, projecting beyond the latter and connected with the same set of differential gearing, means connected with the last mentional shaft and the tubular shaft for rotating the driving wheels on one side of the vehicle, a second tubular shaft connected with the other set of differential gearing and extending from the latter outwardly through the other end of the gear casing, a shaft journaled within and projecting beyond the latter tubular shaft and connected with the differential gearing thereof, and means connected with the last mentioned tubular shaft and the shaft journaled therein for rotating the driving wheels on the other side of the vehicle.

2. In an automotive vehicle, a plurality of driving wheels on each side of the vehicle, a sprocket wheel attached to each of the driving wheels, a gear casing connected to and extending transversely of the frame of the vehicle, a pair of alined shaft sections within the gear casing, differential gearing within the casing and connecting the adjacent ends of the shaft sections, said differential gearing comprising pinions secured to the respective shaft sections, a master gear connected with the differential gearing, means for driving the master gear, a differential housing within said casing and connected with each of the shaft sections, bearings within which the shaft sections are journaled, said bearings projecting from the gear casing and supporting the respective shaft sections between the differential housings and the pinions thereon, a set of differential gearing within each of said differential housings, a tubular shaft connected with one set of differential gearing and journaled within and extending outwardly through one end of the gear casing, a shaft journaled within said tubular shaft, projecting beyond the latter and connected with the same set of differential gearing, sprocket wheels connected with the last mentioned shaft and the tubular shaft, sprocket chains connecting the last mentioned sprocket wheels with the sprocket wheels of the driving wheels on one side of the vehicle, a second tubular shaft connected with the other set of differential gearing and extending from the latter outwardly through the other end of the gear casing, a shaft journaled within and projecting beyond the latter tubular shaft and connected with the differential gearing thereof, sprocket wheels connected with the last mentioned tubular shaft and the shaft journaled therein, and sprocket chains connecting the last mentioned sprocket wheels with the sprocket wheels of the driving wheels on the other side of the vehicle.

3. A structure as set forth in claim 2 in which there is a pair of driving wheels on each side of the vehicle and the gear casing is between the pairs of the wheels, whereby the sprocket chains of each pair extend in opposite directions.

In testimony whereof I have signed my name to this specification.

ORVILLE RAYMOND ROBINSON.